US011073084B2

(12) United States Patent
Kraft et al.

(10) Patent No.: US 11,073,084 B2
(45) Date of Patent: *Jul. 27, 2021

(54) TURBOCOOLED VANE OF A GAS TURBINE ENGINE

(71) Applicant: Powerphase International, LLC, Hobe Sound, FL (US)

(72) Inventors: Robert J. Kraft, Tequesta, FL (US); Peter Perri, Jupiter, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/601,235

(22) Filed: Oct. 14, 2019

(65) Prior Publication Data

US 2020/0049073 A1    Feb. 13, 2020

Related U.S. Application Data

(63) Continuation of application No. 15/228,815, filed on Aug. 4, 2016, now Pat. No. 10,443,501, which is a (Continued)

(51) Int. Cl.
| | |
|---|---|
| *F02C 7/18* | (2006.01) |
| *F02C 6/08* | (2006.01) |
| *F02C 7/08* | (2006.01) |
| *F01D 5/18* | (2006.01) |
| *F01D 25/12* | (2006.01) |
| *F02C 7/12* | (2006.01) |

(52) U.S. Cl.
CPC ............... *F02C 7/18* (2013.01); *F01D 5/187* (2013.01); *F01D 25/12* (2013.01); *F02C 6/08* (2013.01); *F02C 7/08* (2013.01); *F02C 7/12* (2013.01); *F02C 7/185* (2013.01); *F05B 2260/232* (2013.01); *F05D 2220/3212* (2013.01); *F05D 2260/213* (2013.01); *Y02E 20/16* (2013.01)

(58) Field of Classification Search
CPC .... F02C 7/185; F02C 7/08; F02C 7/18; F02C 6/08; F01D 5/187; F01D 25/12; F05D 2260/213; F05D 2260/232
See application file for complete search history.

(56) References Cited

U.S. PATENT DOCUMENTS

| | | |
|---|---|---|
| 3,663,118 A | 5/1972 | Johnson |
| 3,796,045 A | 3/1974 | Foster |
| (Continued) | | |

FOREIGN PATENT DOCUMENTS

WO    2013116185    8/2013

OTHER PUBLICATIONS

International Search Report and Written Opinion dated May 1, 2017 for International Patent Application No. PCT/US2016/045487.

(Continued)

*Primary Examiner* — Steven M Sutherland
(74) *Attorney, Agent, or Firm* — Avant Law Group, LLC

(57) ABSTRACT

The present invention discloses a novel apparatus and methods for providing a flow of cooling air to one or more turbine nozzles or turbine blade outer air seals. The flow of cooling air is provided by an external source and regulated in order to improve turbine nozzle and air seal cooling efficiency and component life.

18 Claims, 9 Drawing Sheets

Related U.S. Application Data continuation-in-part of application No. 14/972,403, filed on Dec. 17, 2015, now Pat. No. 10,358,979.

(60) Provisional application No. 62/201,031, filed on Aug. 4, 2015, provisional application No. 62/112,263, filed on Feb. 5, 2015.

(56) References Cited

U.S. PATENT DOCUMENTS

| | | | |
|---|---|---|---|
| 4,314,442 A * | 2/1982 | Rice | F01D 5/187 |
| | | | 60/775 |
| 4,528,811 A | 7/1985 | Stahl | |
| 5,611,197 A | 3/1997 | Bunker | |
| 5,640,840 A | 6/1997 | Briesch | |
| 6,050,079 A | 4/2000 | Durgin | |
| 6,481,212 B2 | 11/2002 | Priestley | |
| 7,412,320 B2 | 8/2008 | Brummel | |
| 7,670,108 B2 | 3/2010 | Lang | |
| 8,079,802 B2 | 12/2011 | Takamura | |
| 9,080,458 B2 | 7/2015 | Romanov | |
| 9,175,604 B2 * | 11/2015 | Charron | F23R 3/26 |
| 9,784,185 B2 | 10/2017 | Kolvick | |
| 2007/0006592 A1 | 1/2007 | Balan | |
| 2009/0155050 A1 * | 6/2009 | Broomer | F01D 25/12 |
| | | | 415/115 |
| 2011/0181050 A1 | 7/2011 | Dinu | |
| 2012/0297789 A1 | 11/2012 | Coffinberry | |
| 2013/0187007 A1 | 7/2013 | Mackin | |
| 2014/0373551 A1 | 12/2014 | Kraft | |
| 2016/0069264 A1 | 3/2016 | Brostmeyer | |
| 2016/0230665 A1 | 8/2016 | Kraft | |
| 2016/0341125 A1 | 11/2016 | Kraft | |

OTHER PUBLICATIONS

International Search Report and Written Opinion dated Mar. 11, 2016 for International Patent Application No. PCT/US2016/012617.
Office Action dated Jan. 22, 2021 issued in Saudi Arabia Application No. 518390868.
Office Action dated Dec. 3, 2019 issued in Japan Application No. 2017-560464.

* cited by examiner

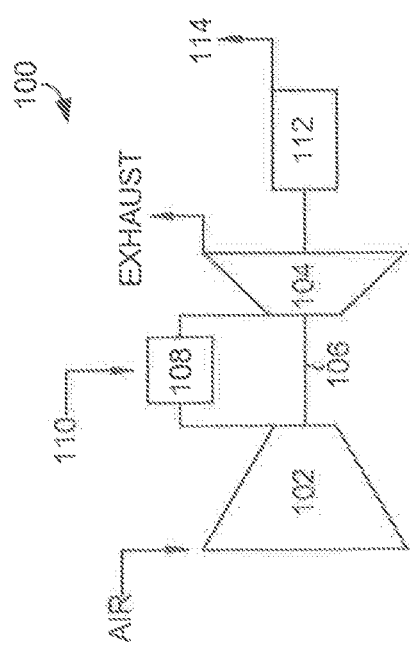
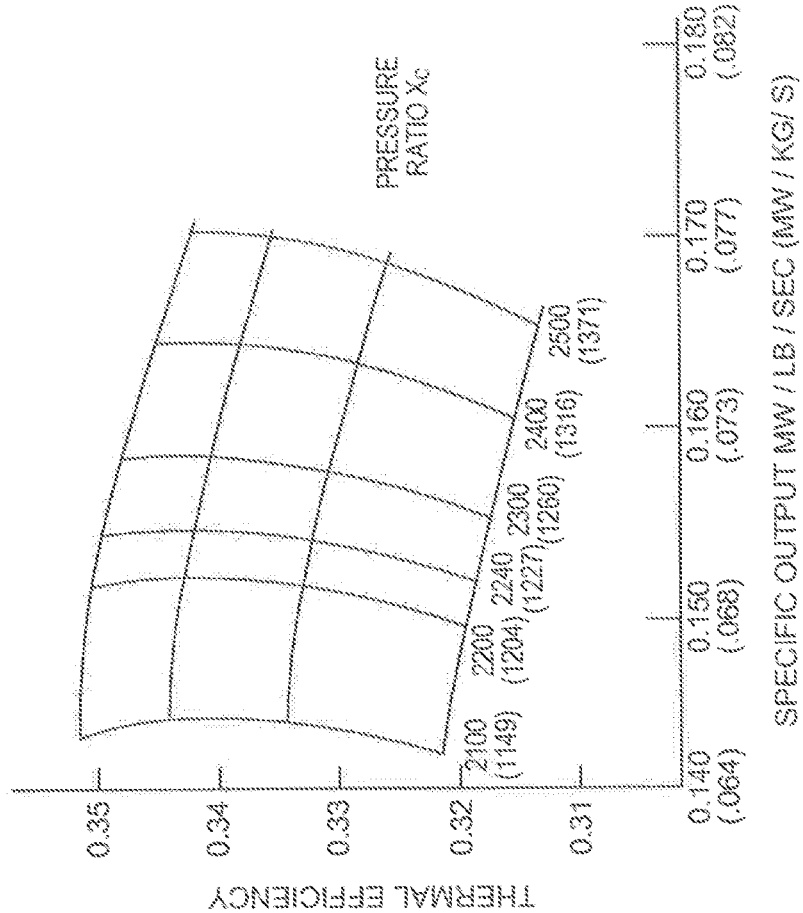
FIG. 1A.
FIG. 1B.

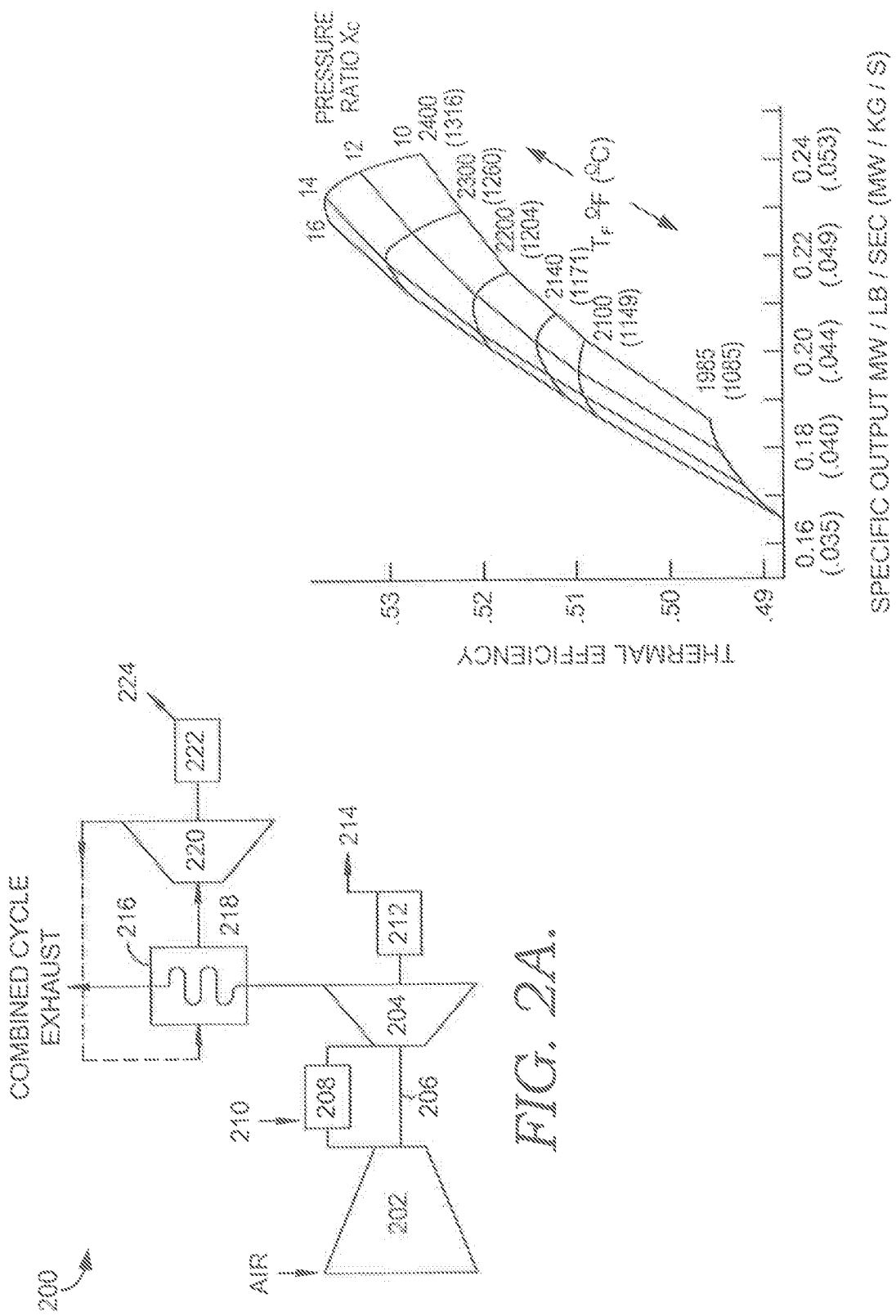

TURBOCOOLED VANE OF A GAS TURBINE ENGINE

CROSS-REFERENCE TO RELATED APPLICATIONS

This application is a continuation of U.S. patent application Ser. No. 15/228,815, filed Aug. 4, 2016, which claims the benefit of priority to U.S. Provisional Patent Application Ser. No. 62/201,031, filed Aug. 4, 2015. U.S. patent application Ser. No. 15/228,815 is also a continuation-in-part of U.S. patent application Ser. No. 14/972,403, filed Dec. 17, 2015, now U.S. Pat. No. 10,358,979, which claims the benefit of priority to U.S. Provisional Patent Application Ser. No. 62/112,263, filed Feb. 5, 2015. Each of these applications is herein incorporated by reference in its entirety.

TECHNICAL FIELD

The invention relates generally to electrical power systems, including the generating capacity of a gas turbine engine, and more specifically to providing an alternate source of cooling air for components of the gas turbine engine.

BACKGROUND OF THE INVENTION

Gas turbine engines are widely understood to be used in conjunction with generators for turning mechanical shaft power into electrical power. Referring initially to FIG. 1A, a schematic for a simple cycle gas turbine engine 100 commonly used in an electrical generating power plant is depicted. The gas turbine engine 100 comprises a compressor 102 coupled to a turbine 104 by a shaft 106. Air from the compressor 102 is directed to one or more combustors 108 where fuel 110 is added to the air. The fuel and air mixture is ignited to form hot combustion gases which drive the turbine 104, which, in turn, drives the compressor 102. The shaft 106 is also coupled to a generator 112, which produces electric power 114. FIG. 1B shows the corresponding gas turbine performance for thermal efficiency as a function of specific output for both simple cycle efficiency and power output for various gas turbine pressure ratio and firing temperatures. As one skilled in the art understands, the firing temperature of a gas turbine engine regulates and limits the overall operation of the engine and the pressure ratio is directly proportional to the efficiency of the gas turbine. For combined cycle gas turbines, as shown in FIG. 2B, the efficiency of the plant is directly proportional to the firing temperature. In other words, increasing firing temperature increases the output of a simple cycle gas turbine, assuming the mass flow is the held constant, and increases the efficiency of the same gas turbine when operating in combined cycle.

In general, the gas turbine original equipment manufacturers have increased firing temperature by improving the technology of the materials and coatings in the turbine section so hotter gasses can be passed through the turbine while maintaining the capability of the turbine parts.

Referring now to FIG. 2A, a schematic for a combined cycle power plant 200 is depicted and comprises a compressor 202 coupled to a turbine 204 by a shaft 206. Air from the compressor 202 is directed to one or more combustors 208 where fuel 210 is added to the air from the compressor 202. The fuel and air mixture is ignited to form hot combustion gases which power a turbine 204, and drives the compressor 202. The shaft 206 is also coupled to a generator 212, which produces electric power 214. A combined cycle power plant 200 also includes a heat recovery steam generator, or HRSG, 216, which receives hot exhaust from turbine 204 and heats a water source to generate steam 218. A steam turbine 220 is powered with steam from the HRSG 216, with the steam turbine 220 driving a second generator 222 for generating additional electrical power 224. FIG. 2B shows the corresponding gas turbine performance for efficiency as a function of firing temperature for both the combined cycle efficiency and power output. FIGS. 1B and 2B are similar to those disclosed in GE Gas Turbine Performance Characteristics (GER3567) and are included herein for reference purposes.

As one skilled in the art understands, firing temperature is defined as the temperature of the combustion gases just downstream of the first stage turbine nozzle. Due to different terminology used in the field of gas turbine engines, the first stage turbine nozzle may also be referred to as a first stage turbine vane. Referring to FIG. 3, a cross section of a portion of a gas turbine engine is depicted and indicates standard temperature parameters utilized in the gas turbine industry. FIG. 3 is also similar to that disclosed in the GE Gas Turbine Performance Characteristics (GER3567) paper referenced above. As shown in FIG. 3, turbine inlet temperature ($T_A$) is measured upstream of a first stage turbine nozzle 300, as depicted by plane A-A. The firing temperature of the engine ($T_B$) is measured just aft of the first stage turbine nozzle, as depicted by plane B-B.

As discussed above, turbine inlet temperature and turbine firing temperature are critical measures by which gas turbine engine operation is based. These temperature readings are taken upstream and downstream of the first stage turbine nozzle, respectively. As such, it is important for the turbine nozzle metal temperature to be maintained within acceptable material operating limits as control of the gas turbine engine is based off of these temperatures.

Due to the high operating temperature of the turbine nozzle, it is necessary to actively cool the turbine nozzle in order to maintain metal temperatures at an acceptable level. Cooling fluid, such as compressed air, is provided to the turbine nozzle as part of the overall Turbine Cooling and Leakage Air (TCLA), or compressed air bypassing the combustion process and used for cooling. TCLA is typically taken from multiple locations in the compressor, including the discharge plenum of a gas turbine engine, with the amount required for cooling turbine components varying by component and by engine type. However, for a General Electric Frame 7FA engine, approximately 20% of the compressed air generated by the engine compressor is used as TCLA. That is, using 20% of the compressed air for cooling means this air cannot go through the combustion system, or is unfired going through the turbine, thereby translating into lost energy for the engine and contributing to the poor thermal efficiency of the gas turbine engine. For example, the aforementioned gas turbine engine has a thermal efficiency of approximately, which is approximately 37 percent.

FIG. 4, which is similar to that disclosed in GE Gas Turbine Performance Characteristics (GER3567), depicts a typical cooling scheme for a first stage turbine nozzle 400. In such a cooling arrangement, compressed air is supplied to an internal passage of the turbine vane and is often directed through a plurality of passageways within the nozzle, some of which can be serpentine in shape. The air for cooling the first stage turbine nozzle is typically produced by the compressor and is taken from a compressor discharge plenum and therefore is at the exit pressure and temperature of the engine compressor. This first stage nozzle, which sees the highest temperature gases from the combustor, is also supplied with the sources of highest pressure cooling air, from the compressor discharge plenum (CDP). That is, the pressure of the gas path is just a couple of pounds per square inch (psi) less than that of the combustor. Therefore, as one skilled in the art can appreciate, the pressure of the cooling air supplied to the leading edge 402 of the first stage nozzle 400 is just high enough to cause air to flow out a series of holes in the airfoil. Cooling hole spacing and orientation can vary, but one such common style places holes in the leading edge 402 of the nozzle 400, also referred to as a showerhead pattern. Further, taking air from the engine compressor to cool the turbine components reduces the power output from the engine, and thus the amount of mechanical work able to be generated by the turbine.

Referring now to FIG. 5, a cross section view of a portion of a gas turbine engine in accordance with a cooling scheme of the prior art is depicted. The gas turbine engine 500 comprises a compressor 502 providing a flow of compressed air into a discharge plenum 504. Most of the air from the compressor 502 passes through one or more combustors 506, the one or more combustors 506 having a combustor case 508, an end cap 510, a combustion liner 512, a swirler assembly 514, a transition piece 516, and a bracket 518 that holds the transition piece 516 to a portion of a turbine frame, here the first stage vane outer ring 520. Air is received in the combustor 506 and mixed with fuel from one or more fuel nozzles 522 to create hot combustion gases passing through the transition piece 516 and into the turbine. In this embodiment, the first stage vane outer ring 520 is fastened to the compressor discharge plenum (CDP) case 524.

Air is maintained in the compressor discharge plenum by seal 526 between the rotor 528 and an inner casing 530 such that most of the air goes to the combustor 506 or for TCLA. The inner casing 530 has a mechanical interface 532 with the first stage turbine nozzle 531 for providing needed structural axial and torsional support. The inner casing 530 is generally supported within compressor discharge plenum case 524 by ID struts 534 located between adjacent combustors 506. The rotor 528 has bearings 536 that tie the rotor 528 to the casing through struts 534.

The cooling air 541 is supplied to the outer diameter of the first turbine nozzle 531 and passes between the first outer vane ring 520 and the compressor discharge plenum case 524 and enters into holes on the first vane outer ring 543 as the first vane outer ring feeds the vane 531 with compressed air from the compressor discharge plenum 504. In this embodiment of the present invention, the compressed air from the compressor discharge plenum 504 is approximately 750 deg. F. at ISO conditions and base load. Similarly, the inner diameter of the first stage nozzle 542 is supplied with turbine cooling and leakage air (TCLA) 552 from the compressor discharge plenum 504. Both first stage nozzle cooling air 541 and 552 flows through the internal passages 531 of the vane, as disclosed in FIG. 4, providing the necessary cooling to the first stage nozzle 542. Eventually this TCLA joins with the hot combustion gases passing between the first stage nozzles 542 and acts as a coolant to reduce the temperature of the hot gases to which the first stage blade 511 is exposed. On subsequent nozzle and rotor stages, the second stage nozzle is sealed to the rotor with a second stage inner support ring 554 and similarly on the third stage with a third stage inner support ring 553.

The following discussion pertains to a General Electric Frame 7FA gas turbine engine at ISO conditions and base load and is provided merely for illustrative purposes as an acceptable engine with which the present invention can be utilized and is not meant to limit the scope of the invention discussed below. The majority (about 80%) of the compressed air from the compressor passes through the combustion system where fuel is added and the mixture is ignited, raising the temperature of the hot combustion gases to approximately 2700 deg. F. There is typically a two to three pound per square inch (psi) pressure drop as the compressed air goes through the combustor. Therefore, because of this arrangement, there is very little pressure margin to cool the nozzle, especially its leading edge. Typically on an F-class gas turbine engine, approximately 10% of the cooling air is diverted from the combustion process and is used to cool the vane. For example, for the 7FA engine, compressor discharge air at approximately 750 deg. F. and 220 psi is used to cool the first stage nozzle. During the cooling process, this air increases in temperature by approximately 250 deg. F. and is then discharged into the gas path, thereby diluting the hotter (~2700 deg. F.) temperature gasses coming from the combustion process, yielding a firing temperature. A typical firing temperature for the 7FA engine is approximately 2450 deg. F. (as taken at plane B-B in FIG. 3) and comprises 900 lb/sec of hot combustion gasses at a temperature of approximately 2700 deg. F. from the combustion process and 100 lb/sec of air at approximately 1000 deg. F. from the cooling air for the nozzle. Therefore, this yields a firing temperature of 2540 deg. F. at plane B-B [(2700*900+100*1000)/1000=2540 deg. F.]. The reason for the higher temperature in the calculation (2540 F>2450 F) is because there is also some combustion dilution and cooling air that mixes out and reduces the actual temperature exiting the combustor, therefore, reducing the temperature at plane B-B. To estimate the effective combustion dilution and leakage air which is at compressor exit temperature (750 deg. F.), (2700*900+100*1000+Flow*750)/(1000+Flow)=2450, and when solving for the flow, Flow=5. Therefore, with a compressor inlet flow of approximately 1005 lb./sec, 900 lb./sec goes through the combustion process, and approximately 5 lb./sec leaks and dilutes the combustion process and 100 lb./sec goes to the first stage nozzle cooling. These numbers do not reflect the fact that in the compressor of the gas turbine, approximately 10% of the 1005 lb./sec going to the turbine inlet is removed before it exits the combustor in order to cool the rotating section and later static sections of the turbine. Therefore, for the example discussed above, all the flow numbers are reduced by 10%, or the combustor flow is approximately 810 lb./sec, the first stage nozzle flow is approximately 90 lb./sec and the combustor dilution and leakage rate is 4.3 lb./sec. As one skilled in the art can appreciate, these numbers are approximate, however, when the leakage and cooling air is mixed in plane B-B, a blended temperature of 2450 deg. F. (firing temperature) results.

An industry standard for determining the cooling benefit achieved through the cooling air is its cooling effectiveness. Cooling effectiveness is understood to be the ratio of the difference between the hot combustion gas temperature and the average metal temperature of the turbine nozzle divided by the difference between the hot combustion gasses and the temperature of the cooling air. As an example, the cooling effectiveness of the first stage turbine vane of the 7FA engine discussed above is approximately 0.59 (the ratio of the temperature difference between the hot combustion gasses (~2700) and average metal temperature (~1550) divided by the difference between the hot combustion gasses and cooling air temperature (~750 F)).

Cooling the highest temperature components, typically the first stage nozzles and first stage blades, is a technology on which every gas turbine engine original equipment manufacturer (OEM) spends significant financial resources. For example, over the last twenty years, large frame gas turbine engines have been improved, but thermal efficiency improvement has risen from about 33% to only about 37%.

SUMMARY

The current invention provides several embodiments for improving the cooling efficiency of gas turbine components, including a first stage turbine nozzle.

In an embodiment of the present invention, a system and method are provided for directing cooling air to a turbine vane comprising an auxiliary source of compressed air having a heated engine, an auxiliary compressor, and a recuperator for providing a supply of heated auxiliary compressed air. The heated auxiliary compressed air is supplied to the plurality of turbine vanes through a conduit such that the auxiliary source of compressed air provides a dedicated supply of cooling air for cooling the turbine vanes.

In an alternate embodiment of the present invention, a system and method are provided for selectively providing cooling air to a turbine vane. A plurality of air cooled turbine vanes, an auxiliary source of compressed air having a heated engine, an auxiliary compressor, and a recuperator are provided. The auxiliary compressed air is supplied to the plurality of turbine vanes through a conduit where the air is selectively directed to cool the turbine vanes. When the auxiliary source of compressed air is not utilized, cooling air for the turbine vanes is supplied from the gas turbine engine compressor.

In an embodiment of the present invention, at least a portion of required turbine cooling and leakage air (TCLA) is provided by an auxiliary source of compressed air having a temperature cooler than the prior art cooling designs, thus reducing the quantity of TCLA required and improving overall efficiency.

In yet another embodiment of the present invention, a system and method are disclosed for providing cooling air to select passages of a turbine vane. Cooling air is generated by an auxiliary compressor and passed through a leading edge region of the turbine vane, with a portion of the air supplied to the leading edge then directed to cool another portion of the turbine nozzle.

In another embodiment of the present invention, a system and method are disclosed for providing cooling air to select passages of a turbine vane. Cooling air is generated by an auxiliary compressor with the distribution of the cooling air varied to the turbine nozzles according to predetermined control parameters.

Additional advantages and features of the present invention will be set forth in part in a description which follows, and in part will become apparent to those skilled in the art upon examination of the following, or may be learned from practice of the invention. The instant invention will now be described with particular reference to the accompanying drawings. Although the first stage nozzle is used as the example for the embodiment, it is intended that this approach outlined in this invention can apply to other components within the turbine section.

BRIEF DESCRIPTION OF THE SEVERAL VIEWS OF THE DRAWINGS

The present invention is described in detail below with reference to the attached drawing figures, wherein:

FIG. 1A depicts a schematic drawing of a simple cycle gas turbine engine.

FIG. 1B depicts the firing temperature relationship to thermal efficiency and output of the engine of FIG. 1A.

FIG. 2A depicts a schematic drawing of a combined cycle gas turbine engine.

FIG. 2B depicts the firing temperature relationship to thermal efficiency and output of the engine of FIG. 2A.

DETAILED DESCRIPTION

The present invention relates to methods and systems of providing cooling air to a plurality of gas turbine engine components such as a turbine vane, and more specifically, a first stage turbine vane so as to improve the overall efficiency of the gas turbine engine. PowerPHASE, LLC, the assignee of the present invention, has a patent pending supplemental compression system known as Turbophase® that delivers air to the compressor discharge region through a compression and heating process that is driven by a separately fueled engine where the waste heat from the engine is used to heat the air compressed prior to injection in the gas turbine engine. Prior art air compression and supply devices fail to provide compressed air at the necessary temperature and pressure to provide ample cooling and improve thermal efficiency of the gas turbine engine.

Figure 3:
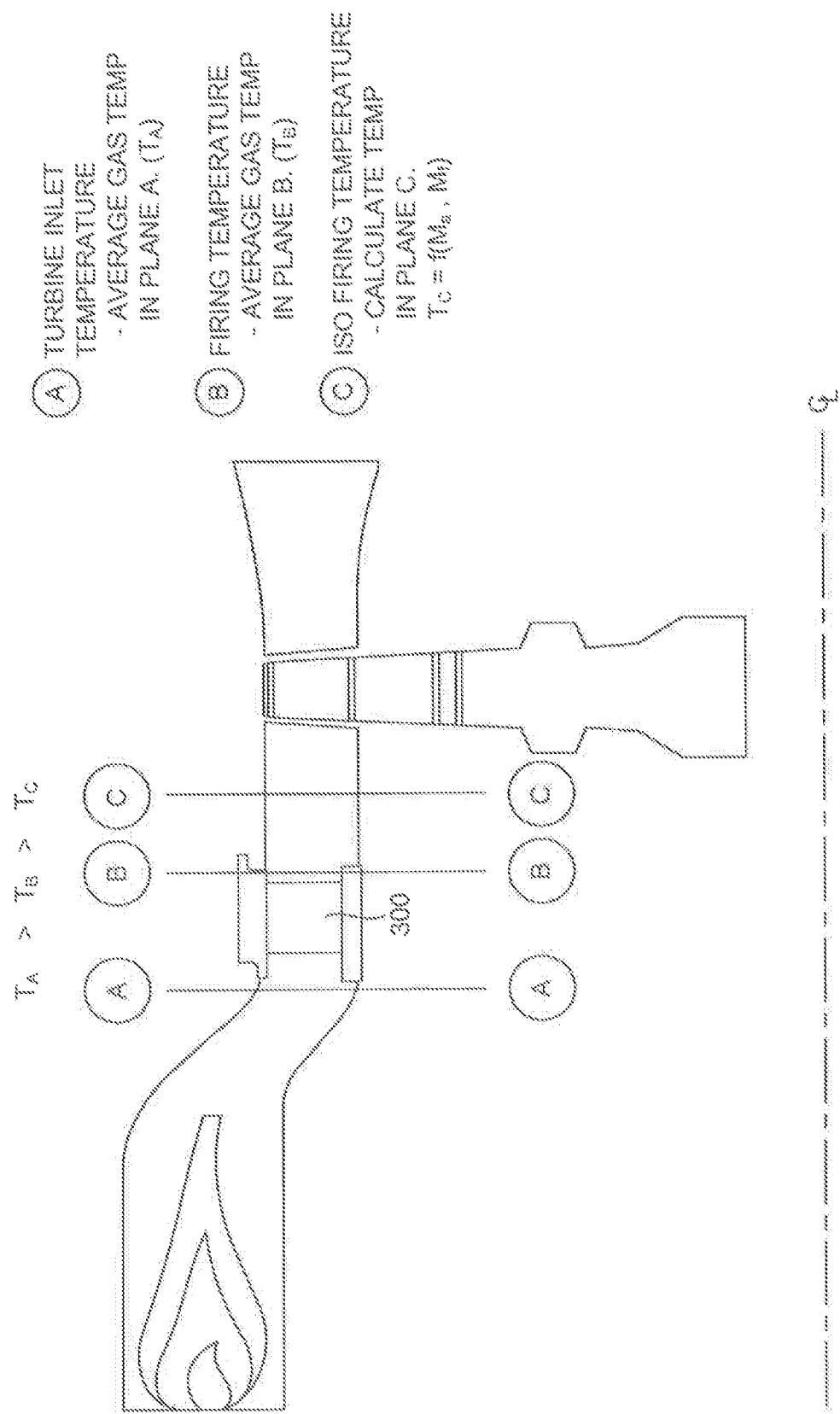
FIG. 3 depicts a partial cross section view of a gas turbine engine indicating axial locations at which standard temperatures are measured.
Figure 4:
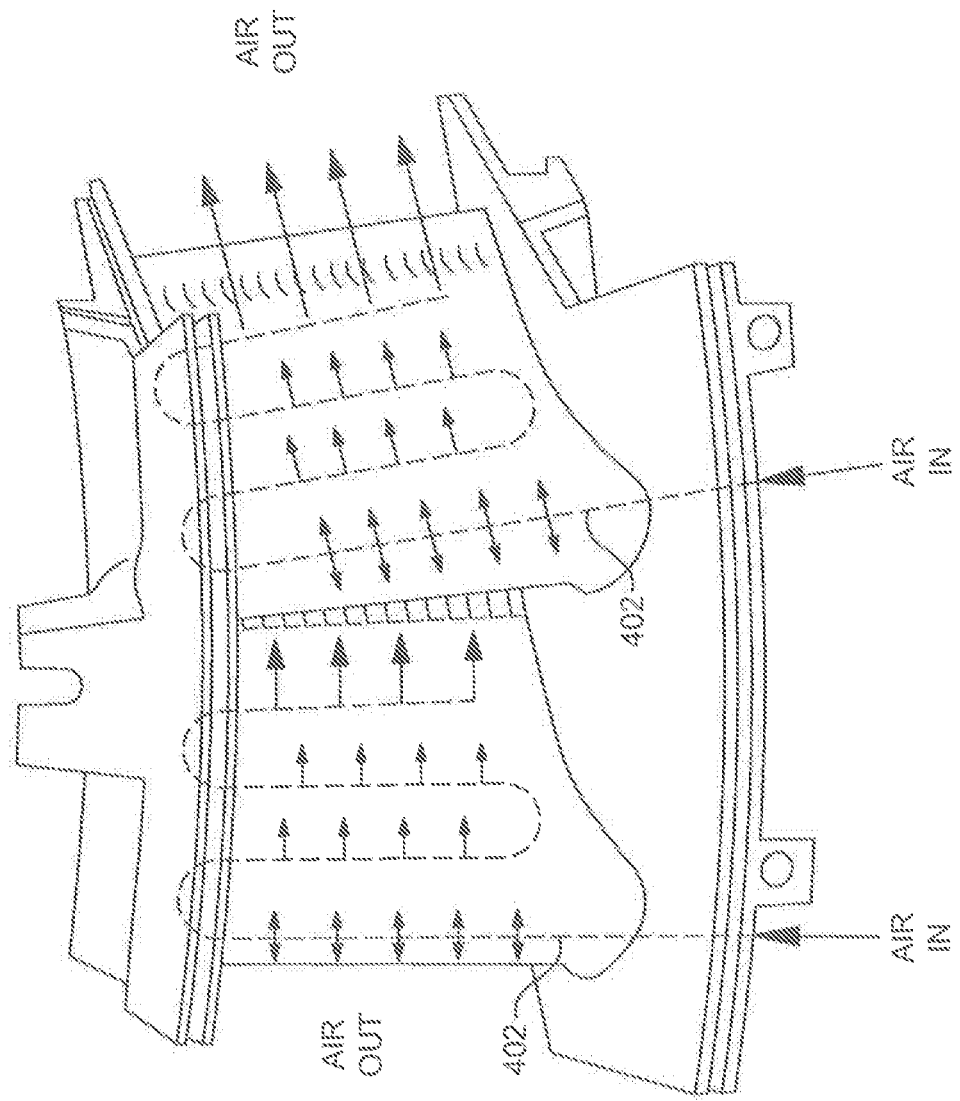
FIG. 4 is a perspective view of a typical gas turbine nozzle depicting its cooling pattern.
Figure 5:
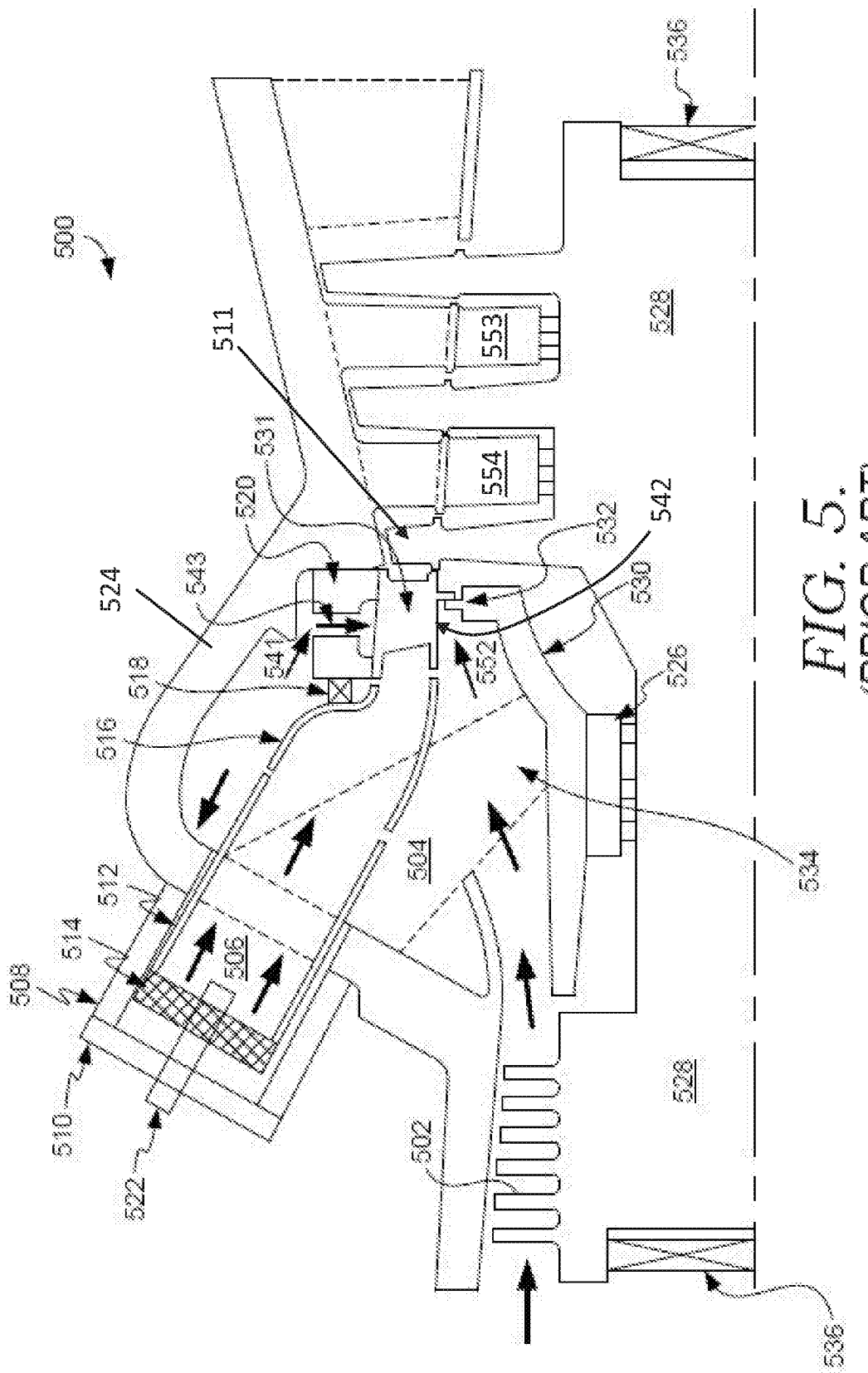
FIG. 5 is a partial cross section view of a gas turbine engine providing a way of directing cooling air to a first stage turbine vane in accordance with the prior art.
Figure 6:
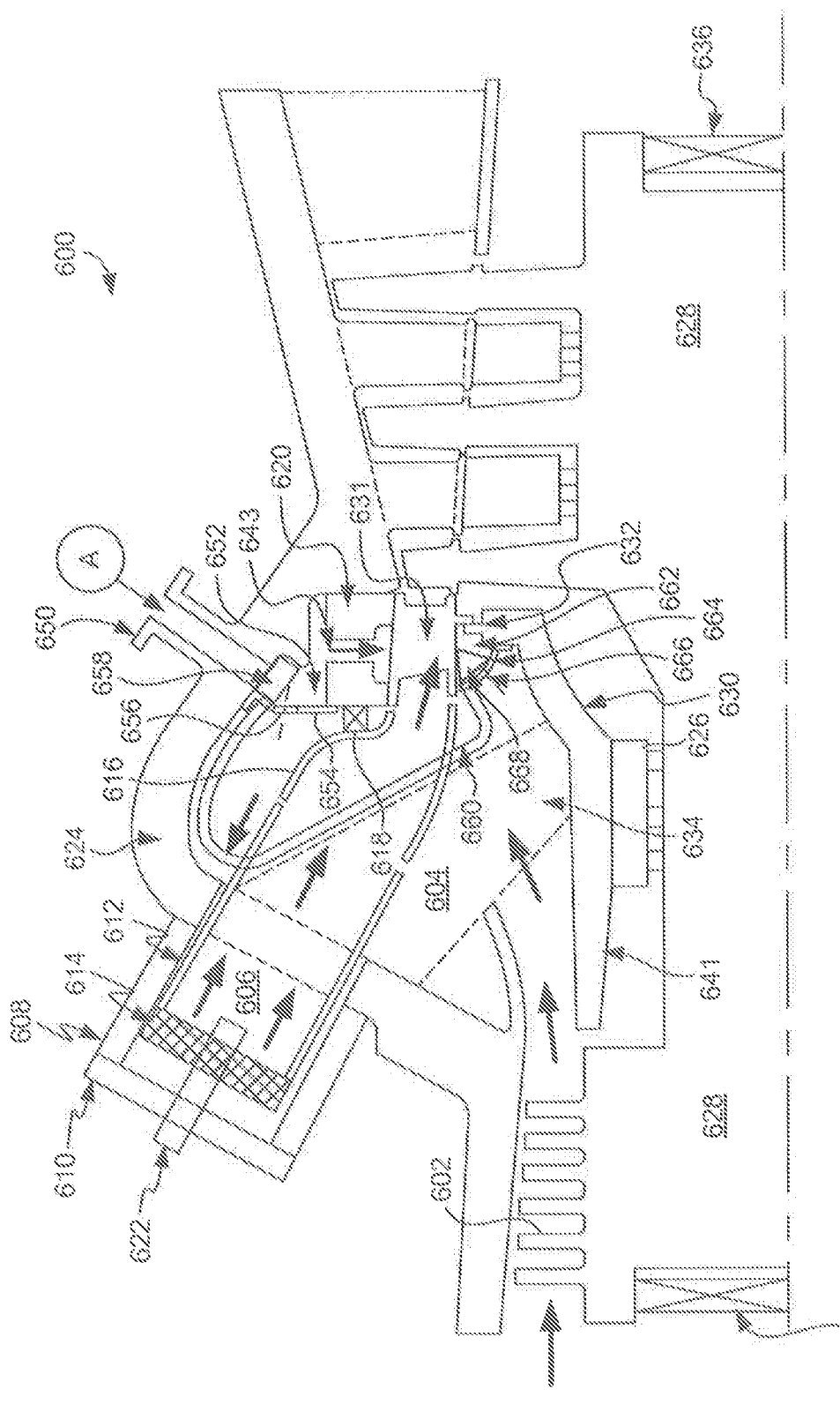
FIG. 6 is a partial cross section view of a gas turbine engine providing a way of directing cooling air to a first stage turbine vane in accordance with an embodiment of the present invention.

Referring now to FIG. 6, a system 600 is shown for providing an alternate source of cooling to a first stage turbine vane 631. The system 600 comprises a compressor 602 providing a flow of compressed air into a discharge plenum 604. Most of the air from the compressor 602 passes through one or more combustors 606, the one or more combustors 606 having a combustor case 608, an end cap 610, a combustion liner 612, a swirler assembly 614, a transition piece 616, and a bracket 618 that holds the transition piece 616 to a portion of a turbine frame, here the first stage vane outer ring 620. Air is received in the combustor 606 and mixed with fuel from one or more fuel nozzles 622. In this embodiment, the first stage vane outer ring 620 is fastened to the compressor discharge plenum (CDP) case 624.

Air in the compressor discharge plenum is sealed between the rotor 628 and an inner casing 630 by seal 626 such that most of the air goes to the combustor 606 or for TCLA (Turbine Cooling and Leakage Air). The inner casing 630 has a mechanical interface 632 with the first stage nozzle 631 for providing needed structural axial and torsional support. The inner casing 630 is generally supported within compressor discharge plenum case 624 by ID struts 634 located between adjacent combustors 606. The rotor 628 has bearings 636 that tie the rotor 628 to the casing through struts 634.

Figure 7:
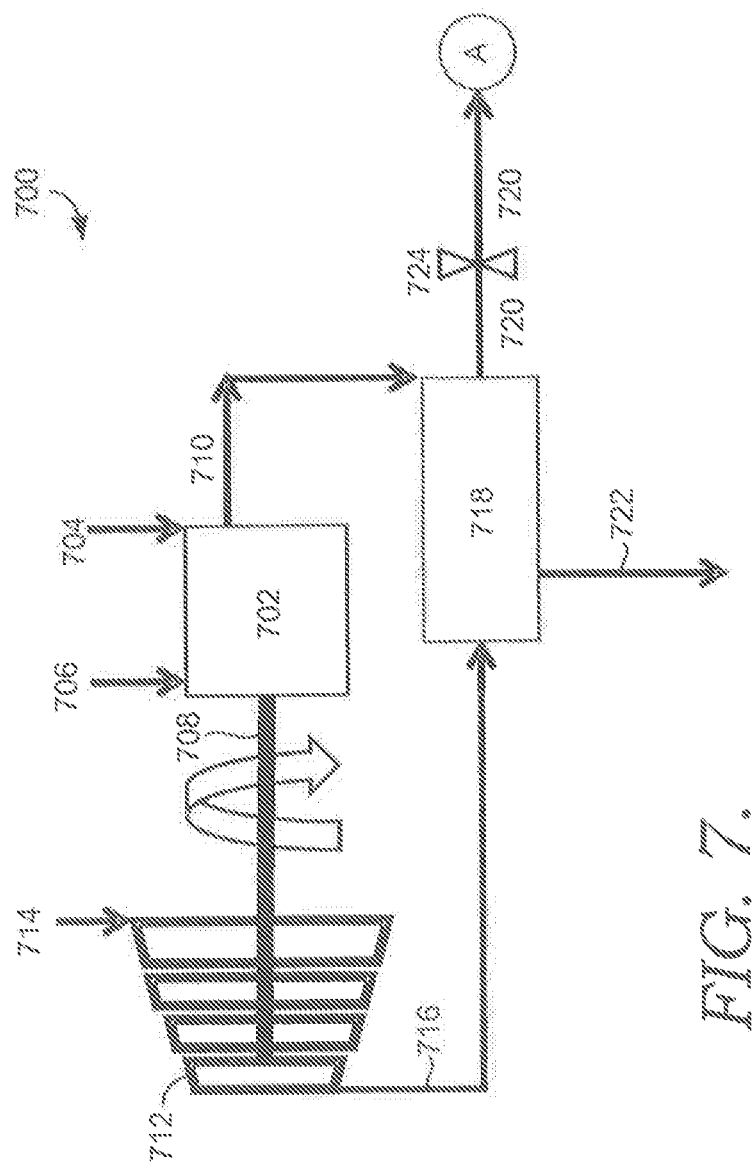
FIG. 7 is a schematic drawing of an auxiliary source of compressed air in accordance with an embodiment of the present invention.

Continuing with respect to FIG. 6, the system 600 also provides an alternate source of TCLA to the first stage nozzle 631 of a gas turbine engine. An air supply source is provided at A to flange 650 for case 624. This air supply source A is generated from an auxiliary source, as shown in FIG. 7. More specifically, and with reference to FIG. 7, an auxiliary source of compressed air 700 comprises a fueled engine 702 which receives air 704 and engine fuel 706 and produces mechanical shaft power 708 and hot exhaust 710. The engine fuel 706 can be natural gas or a liquid fuel. The mechanical shaft power 708 is used to drive a multi-stage intercooled compressor 712 where ambient air 714 is taken in and compressed and cooled at each stage of the compressor 712. The compressor 712 produces a supply of warm compressed air 716 which is directed through a recuperator 718, further heating the compressed air 716 with the hot exhaust 710 from the fueled engine 702, thereby producing heated compressed air 720 and warm exhaust 722. This heated compressed air has a temperature of approximately 400 deg. Fahrenheit and warm exhaust 722. The auxiliary source of compressed air 700 can also include a valve 724 for regulating the flow of heated compressed air 720.

One such auxiliary source of compressed air representative of FIG. 7 and capable of being utilized with the present invention is the patent pending Turbophase® system produced by PowerPHASE LLC of Jupiter, Fla. In this system, air is compressed and heated to an intermediate temperature of approximately 400 F and supplied at a slightly higher pressure than compressor discharge pressure of the compressor 602. The heated compressed air 720 is generated approximately 25% more efficiently than the compressed air from compressor 602 due to the patent pending generation process of the system.

Referring back to FIG. 6, the auxiliary source of compressed air 700, denoted as A in FIG. 6, is injected into an outer diameter plenum 652 that is formed with a seal 654 between the compressor discharge plenum 624 and the first stage turbine vane support ring 620. The seal 654 further comprises air supply holes 656 for supplying the TCLA air. This plenum 652 also comprises a swirler 658 which is designed to provide multiple functions. That is, when heated compressed air is being delivered at A, the tangential swirl of the air reduces the actual flow of air that can enter the first stage nozzle 631 and aerodynamically blocks some of the air from the compressor 602 from flowing through the supply holes 656. When heated compressed air is not being supplied at A, the supply holes 656 are large enough in size to supply the turbine nozzle 631 with the required level of cooling air. Air is then supplied to the vane 631 through inlet 643. If the supply of compressed air at A is prime reliable, the supply holes 656 can be removed.

Compressed air for cooling can also be provided to the inner diameter region of the first stage nozzle 631. More specifically, and with reference to FIG. 6, compressed air is taken from plenum 652 and directed through multiple pipes 660 to an inner diameter plenum 662 and into the inner diameter region of the first stage nozzle 631. Also located at the inner diameter plenum 662 is a seal 664 positioned between the first stage nozzle inner diameter platform and the inner case 641. This seal 664 has TCLA supply holes 666 placed therein. This plenum 662 also contains a swirler 668 that is designed to provide two functions. First, when compressed air from the auxiliary source of compressed air 700 is being delivered at A, a tangential swirl is imparted reducing the actual flow of air that can get onboard the first stage nozzle 631 and aerodynamically blocks some of the compressor discharge air from flowing through the TCLA supply holes 666. When the auxiliary source of compressed air 700 is not delivering air, the TCLA supply holes 666 are large enough to supply the first stage nozzle 631 with the current level of TCLA. If the Turbophase® TCLA is prime reliable, the TCLA supply holes 666 can be removed.

Figure 8:
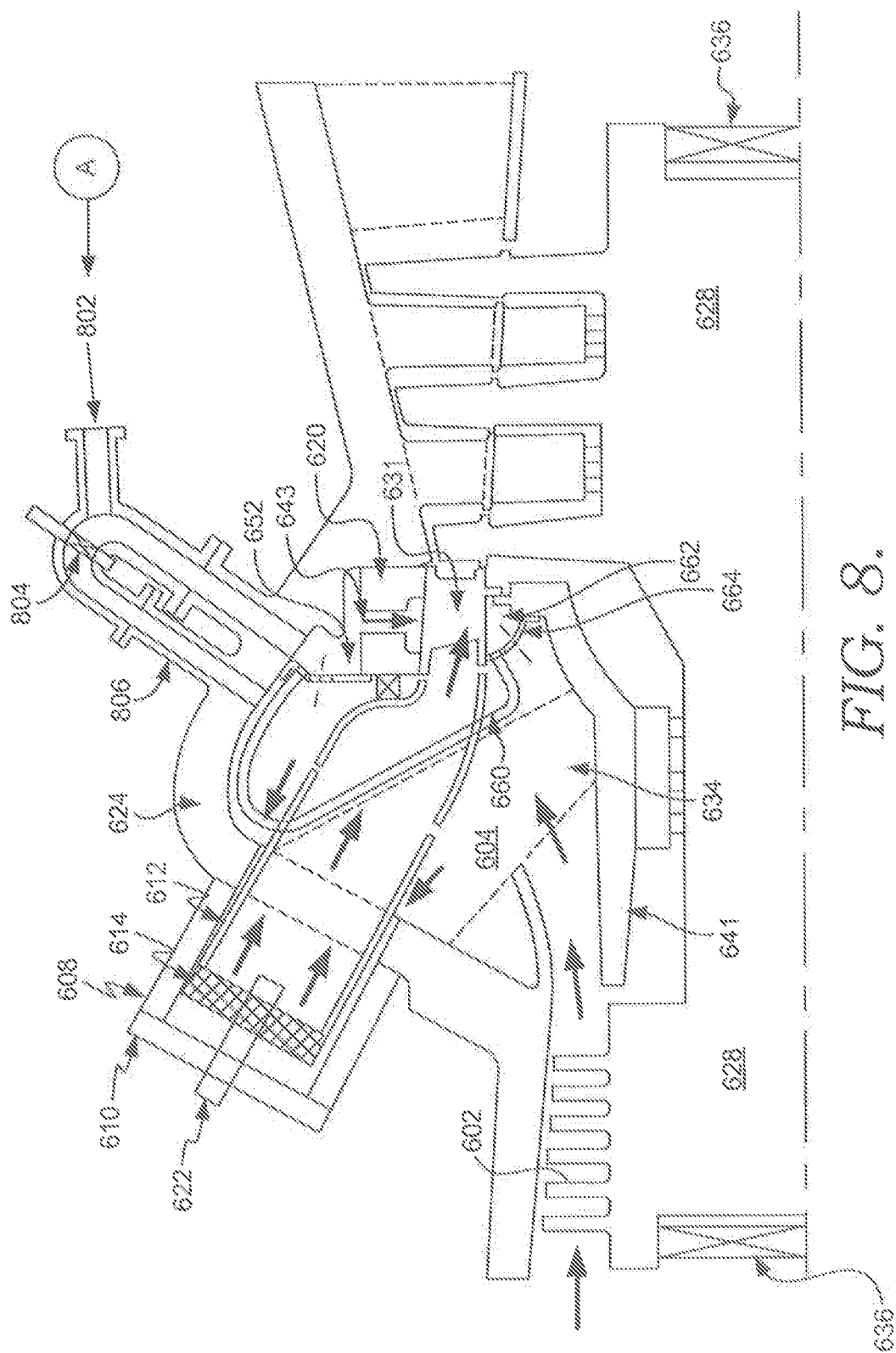
FIG. 8 is a partial cross section view of a gas turbine engine providing a way of selectively directing cooling air to a first stage turbine vane in accordance with an alternate embodiment of the present invention.

Referring now to FIG. 8, an alternate embodiment of the present invention is depicted. In this embodiment of the present invention, compressed air from an auxiliary source of compressed air, depicted as A, is provided into inlet flange 802. Located adjacent the inlet flange 802, is a control valve 804. When the control valve 804 is closed, all of the air is forced to go into the first stage nozzle outer diameter region 652 and the first stage nozzle inner diameter region 662, by way of pipes 660 to supply air to the first stage nozzle 631.

As one skilled in the art can appreciate, the valve 804 can be a control valve or a check valve. If the auxiliary source of compressed air is not operational and supplying air, then the control valve 804 is open and air can flow from the gas turbine compressor discharge plenum 604 through compressor discharge flange 806 into the outer diameter plenum 652 and inner diameter plenum 662, via pipes 660, to supply air to the first stage nozzle 631. If valve 804 is open and there is air being supplied at A, depending on the pressure and flow of the added air, air from the gas turbine's compressor discharge case may flow into or out of flange 806. If flow is flowing out of flange 806, then the resultant temperature of the mixed air stream, the mixture of the air from the auxiliary compressor source A and the air from the gas turbine compressor discharge case, will result in a mixed out temperature. Since the gas turbine compressor exit temperature is typically about 750 deg. F. and the air being supplied from the auxiliary compressor is lower than 750 deg. F., the mixed out temperature will be cooler than the compressor discharge temperature. If no air is supplied from the auxiliary compressor source A, then the compressor discharge air would flow out of flange 806 and supply cooling air to the nozzle.

By having higher pressure air available from an external compressor at A, other functions can be accomplished. Typically in gas turbines, the space between the rotating blade inner diameter platforms and the adjacent upstream and downstream nozzles, also known as rim cavities, is a very sensitive and sometimes troublesome area to keep cool. The pressurized gas in the flow path is discouraged from flowing into the rim cavities by providing TCLA to the rim cavities where the TCLA has a higher pressure than the pressurized gas in the flow path. Several gas turbines today have extremely low pressure margin in the rim cavities, and consequently are limited in their operation or are forced to significantly increase TCLA to maintain proper rim cavity temperatures. Since the auxiliary source of compressed air can supply air at a higher pressure than the engine compressor 602, or TCLA pressure, the current TCLA usage can be reduced which will result in improved engine efficiency.

A characteristic of a typical gas turbine engine is that as coolant temperature is reduced, less air is required to perform the same level of cooling in order to maintain a minimum metal temperature on the cooled components in the turbine. This can lead to an improvement in efficiency.

For example, alternate original equipment manufacturers including Siemens Westinghouse and Mitsubishi Heavy Industries employ a cooling system for TCLA that is also used in part of the turbine. This system is called a Rotor Air Cooler (RAC) system and routes a portion of the TCLA outside the gas turbine engine to a cooler, where the air temperature is reduced from about 750 deg. F. to approximately 450 deg. F. This temperature reduction is sufficient enough to reduce the amount of cooling air needed, but still high enough to eliminate risk of thermal shock to the parts receiving the cooled air. After the cooler, the RAC air is piped back to the rotating section of the gas turbine engine because of the pressure sensitivities discussed earlier.

These performance gains can be made with a passive cooling system, meaning the air from the auxiliary source of compressed air is directed to the inlet of the cooling system for the first stage turbine nozzle such that the control system of the gas turbine can be adjusted appropriately to maintain the same first stage nozzle temperature. With this passive system, when the auxiliary source of compressed air is not running, the firing temperature would remain unaffected, but as the flow rate of the cooler cooling air is directed to the first stage turbine nozzles, then the fuel flow to the combustor can be increased proportionately to increase the power and efficiency of the gas turbine system.

A non-passive, or dedicated system can also be employed where all of the cooling air supplying the first stage nozzle comes from the auxiliary source of compressed air and, as a result, would be a must run and prime reliable system. In this configuration, a higher pressure and different cooling scheme could be deployed increasing the cooling effectiveness of the first stage nozzle. For example, if the cooling effectiveness was able to be improved by approximately 10%, of from 0.59 to 0.65, the volume of cooling air can be reduced about 10 lb./sec which would result in about 4 MW of additional power on a 170 MW gas turbine, or about 2.4% power and efficiency improvement. This incremental power and efficiency is additive to the cooler cooling air and constant cooling effectiveness described above.

Figure 9:
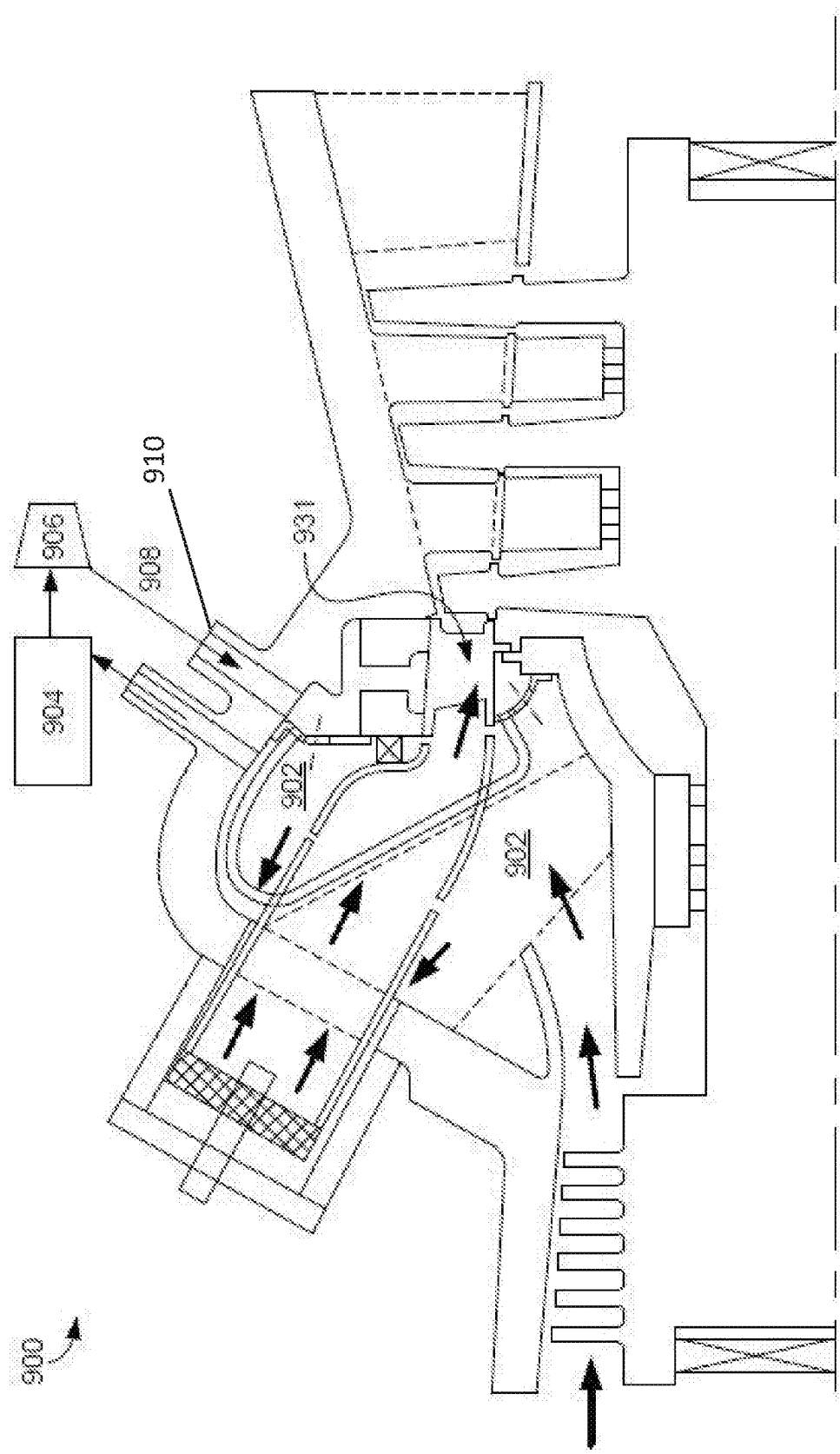
FIG. 9 is a partial cross section view of a gas turbine engine providing an alternate way of directing dedicated cooling air to cool a first stage turbine vane in accordance with an alternate embodiment of the present invention.

Referring now to FIG. 9, an alternate embodiment of a dedicated cooling system 900 involves a closed loop system where air is extracted from the compressor discharge plenum 902, cooled by a cooler 904, and then increased in pressure by compressor 906. The pressurized air 908 is then piped in through inlet 910 to a dedicated cooling system to cool the first stage nozzle 931. Instead of the cooling air being discharged into the hot gas path as traditionally done in air cooled nozzles, a portion or all of the cooling air is returned back into the compressor discharge plenum 902 where it goes through the combustion process, effectively recycling the cooling air. One significant benefit of this process is that the mass flow of the exhaust of the gas turbine can be kept relatively constant as no new air is added to the gas turbine cycle and therefore the mass flow of the gas turbine exhaust is relatively unchanged and therefore makes permitting significantly easier. For example, combined cycle power plants today may use duct burners that have an emissions production much higher than the gas turbine itself for incremental power. Since the auxiliary source of compressed air works on the gas turbine and has emissions characteristics of the gas turbine, the incremental emissions are much lower per incremental megawatt of power generated.

The other benefit realized through the closed loop cooled first vane of FIG. 9 is that with a constant mass flow through the turbine, the back pressure on the gas turbine compressor is not impacted, which allows the system to be used at all gas turbine load conditions. Currently, the auxiliary source of compressed air is primarily a power augmentation system and although it can provide some part load benefits, it is somewhat limited at very low loads due to gas turbine compressor surge limitations. The closed loop cooling system shown in FIG. 9 can be effectively controlled to elevate the temperature of the air being returned from the cooled first vane 931 by increasing or decreasing the cooling that is applied to the air as it is pulled off the compressor discharge plenum which will allow the gas turbine lower operating limit to be lowered even further.

However, with using cooler air to cool the nozzle (approximately 400° F.), the air exiting the nozzle will be much cooler (approximately 700° F. instead of 1000° F.), therefore the firing temperature will effectively be reduced because of the cooler nozzle cooling air mixing with the hot gas path gas. By maintaining the same cooling effectiveness and reducing the coolant temperature the firing temp can effectively be increased. For example, for an embodiment of the present invention, the cooling effectiveness is approximately 0.59 [(2700−1550)/(2700−750)=0.59]. Holding this constant with a higher combustor temperature and a lower coolant temperature yields an increase in combustion temperature of: 0.59=(2700+x−1550)/(2700+x−400), x=504 F. Therefore, with cooler cooling air to the first stage nozzle the effective firing temperature can be increased about 500° F. while maintaining nozzle metal temperatures and life and significantly increasing the power and efficiency of the gas turbine system.

In prior art gas turbines, static components, such as the first stage nozzle (also referred to as a turbine vane) are air cooled through a difference in air pressure across the nozzle. The nozzle is cooled with compressor discharge air, and due to the similar pressures external to the nozzle, very little pressure margin exists at the leading edge of the nozzle. For example, if the pressure drop across the combustor is 2.5% and the compressor discharge pressure is 220 psig, then the pressure that the nozzle sees at the leading edge is approximately 214.5 psi, leaving only about 5.5 psi of pressure to force the air through the cooling system of the vane and out through its leading edge. For this reason, the air supply to the vane leading edge is typically taken with as little pressure drop as possible. For example, air can be taken from the inner diameter region of the transition pieces such that it attempts to capture some of the total pressure associated with the flow velocity coming out of the compressor diffuser. Likewise, within the nozzle, the leading edge, which typically consumes a significant amount of cooling air, is transpiration and film cooled where the majority of the heat transfer employed to keep the nozzle cool is a combination of conduction of heat to the cooling air as the air passes through a series of leading edge shower head holes. Advanced gas turbines typically will have hundreds of cooling holes densely packed in the leading edge of the nozzle to provide this function. After the air goes through these holes in the nozzle leading edge, the air is directed to lay down as a film cooling layer over the nozzle airfoil surface to dilute the hot gasses that impinge directly on the nozzle.

The present invention provides cooling air at a pressure that can be adjusted above the compressor discharge pressure thereby providing a different and more efficient cooling scheme to the leading edge of the nozzle. Use of a separately driven compressor, electrically powered or powered via an auxiliary engine, provides a source of compressed air with a means to direct this air to the nozzle through a piping and manifold network, providing a dedicated supply of air to the nozzle. Instead of utilizing prior art conduction and film cooling schemes, a significant pressure drop can be used to first create back side impingement directly on the leading edge, improving heat transfer and thus reducing the amount of conduction and film necessary to cool the nozzle leading edge. Some other unique features can also be added where the supply of the air to the impingement holes can be designed such that if there is a hole burned into the nozzle leading edge from something unexpected, such as Foreign Object Damage (FOD) resulting from bad fuel, the pressure supplying the leading edge impingement can be designed or adjusted real time to provide adequate cooling to prevent the nozzle from having a catastrophic event, such as a complete burn through of the airfoil.

Additionally, as one skilled in the art can appreciate, turbine nozzles typically include multiple cooling circuits. One such circuit is the trailing edge circuit, which requires significantly less pressure to drive the cooling flow because it is discharging its cooling air at the exit plane of the nozzle, after the pressure drop associated with the nozzle has occurred. Consequently, a portion of the air used for impingement cooling of the nozzle leading edge can be directed internal to the nozzle and provide cooling along its path to the trailing edge region of the nozzle where it can be used to cool the trailing edge of the nozzle. This is different from prior art nozzles in which air used to cool the leading edge of the nozzle is dedicated to only the leading edge region. Here, when the pressure is increased above the compressor discharge pressure, the air can be used to cool the leading edge as well as the mid-section of the nozzle and/or the trailing edge of the nozzle. This multi-purpose use of the cooling air leads to a significant reduction of the cooling air required to cool the nozzle and hence an efficiency improvement in the gas turbine system.

Additionally, as one skilled in the art can appreciate, the nozzle cooling system is designed to meet an inspection interval, typically 24,000 hours between inspections. The design point is the hottest condition, typically base load operation, and at part load, where firing temperature is reduced, the nozzle metal temperatures are also reduced below design conditions. With a separately cooled nozzle system, the pressure, temperature and/or flow can be varied to increase metal temperatures at part load conditions, thus further reducing cooling air to the nozzle and improving part load efficiency.

Similarly, there are typically hot spots in the nozzle, that is, regions of the nozzle that operate at higher metal temperatures. These regions are sometimes associated with the tangential location of the nozzle relative to the transition pieces. For example, in one engine, such as a Siemens Westinghouse 501F gas turbine, there are sixteen transition pieces and thirty-two first stage nozzles. Sixteen of the nozzles are located at the transition piece sidewall with the remaining sixteen nozzles located in the middle of the transition piece discharge frame. Consequently, the nozzles located at the sidewall of the transition piece see a lower hot gas path temperature because of the transition piece side wall cooling and leakage flow. Thus, these nozzles typically run at a much lower temperature than nozzles directly exposed to hot combustion gases exiting the transition piece. With a dedicated nozzle cooling system, as disclosed herein, the cooling air supply can be split into two regions and controlled separately, such that the metal temperatures, and hence life of the nozzle, is the same for the nozzles located near the transition piece side wall and the nozzles in the path of the transition piece discharge.

As one skilled in the art will understand, regulation of the cooling air flow can occur by a variety of means. For example, exemplary means for regulating the flow of cooling air to the nozzle can include various engine control algorithms as well as mechanical means, including, but not limited to flow control valves and metering plates.

This unique cooling configuration and process can also be applied to sectors of turbine nozzles. In many cases, the hot gas temperature from the combustor varies around the circumference of the gas turbine nozzle inlet region. With a dedicated nozzle cooling system that is broken up into sectors, each sector can be adjusted to provide constant cooling temperature and life even with varying gas temperatures. With this arrangement, if there is an unexpected event like FOD causing premature failure of the component, the cooling air temperature, flow rate, and/or pressure can be adjusted to compensate to prolong the life of the component in an efficient manner. As one skilled in the art can appreciate, to achieve a desired cooling effect, multiple combinations of the pressure, temperature and flow rate of the cooling air can be adjusted independently to achieve similar results. Consequently it is also envisioned specifically, in some cases, the pressure may not be elevated to cool the nozzle components. Although the first stage turbine nozzle was used herein, application of the present invention to the first stage nozzle was merely one representation of potential uses of the present invention. The present invention is also applicable to other static components including other turbine nozzles and shroud blocks.

As one skilled in the art can appreciate, the principle described for the reduction in cooling air to the first turbine vane, directly translates into efficiency improvements, and can also be applied to other turbine components. For example, the first stage blade out air seal is a seal located radially outward of the first stage turbine blade. This is also a challenging part to cool because of the operating pressure and temperature. Therefore, with a separate source of cooling air where the air pressure can be controlled higher that what is available within the gas turbine, allows for alternate cooling techniques to be deployed, where the cooling air if first used to provide backside cooling with some impingement arrangement, and then laid down as film.

As discussed above, the present invention provides a way of cooling a turbine nozzle where the cooling air is provided through a separate process external to the gas turbine engine, such as through an auxiliary source of compressed air 700 as shown in FIG. 7. The cooling air compressed in this manner has a pressure above the air in the compressor discharge plenum and is directed to a leading edge of the turbine nozzle. In an embodiment of the present invention, a portion of the air from the leading edge is then directed to cool a portion of the turbine nozzle aft of the leading edge, such as the trailing edge or mid-body portions of the turbine nozzle. This recycling or reuse of the cooling air is possible due to the cooler temperature and higher pressure of the air, as generated by the auxiliary source of compressed air.

In an embodiment of the present invention, the distribution of compressed air from the auxiliary source of compressed air is controlled, so as to vary the flow to the turbine nozzle, according to a predetermined control parameter. A variety of control parameters can be used including air pressure, temperature, the flow rate of air, or a combination of these control parameters. That is, the amount of cooling flow provided to the turbine nozzle being generated by the separate external process is regulated based on respective air pressure, temperature, or air flow rate of the cooling air. This process is regulated by a system which measures the control parameters of the air produced by the auxiliary source of compressed air as well as the temperature and pressures at the turbine nozzle and adjusts the flow of cooling air to the turbine nozzle accordingly.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive. Specifically, the first stage nozzle is used as an example in this this application, however, the principles apply to the other rotating and stationary turbine components, typically referred to as hot gas path components.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of cooling a turbine nozzle in a gas turbine engine, the gas turbine engine having a compressor section, a compressor discharge plenum, a combustor section, and a turbine section fluidly connected to each other, the method comprising:
    compressing a portion of a cooling air for the turbine nozzle through a separate process external to the gas turbine engine to form a supply of compressed air;
    directing the supply of compressed air to a leading edge of the turbine nozzle for backside cooling of the leading edge; and,
    directing a portion of the supply of compressed air from the leading edge to a portion of the turbine nozzle aft of the leading edge.

2. The method of claim 1, wherein the supply of compressed air is used to cool a mid-body portion of the turbine nozzle after backside cooling the leading edge of the turbine nozzle.

3. The method of claim 1, wherein the supply of compressed air is used to cool a trailing edge of the turbine nozzle after back side cooling the leading edge of the turbine nozzle.

4. The method of claim 1, wherein the separate process external to the gas turbine engine comprises a fueled engine coupled to one or more compressors.

5. The method of claim 4, wherein the separate process further comprises a recuperator.

6. The method of claim 1, wherein the supply of compressed air is directed to the leading edge via a supply opening in the compressor discharge plenum.

7. The method of claim 6, wherein the separate process comprises a fueled engine coupled to a compressor.

8. The method of claim 1, wherein the supply of compressed air has a pressure above a pressure of air in the compressor discharge plenum.

9. A method of cooling a turbine nozzle in a gas turbine engine, the gas turbine engine having a compressor section, a compressor discharge plenum, a combustor section, and a turbine section fluidly connected to each other, the method comprising:
    compressing at least a portion of a cooling air for the turbine nozzle using a fueled engine and a fueled engine compressor external to the gas turbine engine to form a supply of compressed air;
    directing the supply of compressed air to a leading edge of the turbine nozzle for backside cooling of the turbine nozzle; and,
    directing a portion of the supply of compressed air from the leading edge to a portion of the turbine nozzle aft of the leading edge.

10. The method of claim 9, wherein the supply of compressed air is used to cool a mid-body portion of the turbine nozzle after backside cooling the leading edge of the turbine nozzle.

11. The method of claim 9, wherein the supply of compressed air is used to cool a trailing edge of the turbine nozzle after back side cooling the leading edge of the turbine nozzle.

12. The method of claim 9, wherein the supply of compressed air is directed to the leading edge via a supply opening in the compressor discharge plenum.

13. The method of claim 9, wherein the supply of compressed air has a pressure above a pressure of air in the compressor discharge plenum.

14. A method of cooling a turbine nozzle in a gas turbine engine, the gas turbine engine having a compressor section, a compressor discharge plenum, a combustor section, and a turbine section fluidly connected to each other, the method comprising:
    compressing a portion of a cooling air for the turbine nozzle using a separate process comprising a fueled engine and a fueled engine compressor external to the gas turbine engine to form a supply of compressed air having a pressure above a pressure of air in the compressor discharge plenum;
    directing the supply of compressed air to a leading edge of the turbine nozzle for backside cooling of the turbine nozzle; and,
    directing a portion of the supply of compressed air from the leading edge to a portion of the turbine nozzle aft of the leading edge.

15. The method of claim 14, wherein the supply of compressed air is used to cool a mid-body portion of the turbine nozzle after backside cooling the leading edge of the turbine nozzle.

16. The method of claim 14, wherein the supply of compressed air is used to cool a trailing edge of the turbine nozzle after back side cooling the leading edge of the turbine nozzle.

17. The method of claim 14, wherein the supply of compressed air is directed to the leading edge via a supply opening in the compressor discharge plenum.

18. The method of claim 14, wherein the separate process further comprises a recuperator.

* * * * *